(12) United States Patent
Xia et al.

(10) Patent No.: US 12,024,660 B2
(45) Date of Patent: Jul. 2, 2024

(54) CONDUCTIVE PARTICLE AND MANUFACTURING METHOD THEREOF, ADHESIVE AND APPLICATION THEREOF

(71) Applicant: HKC CORPORATION LIMITED, Shenzhen (CN)

(72) Inventors: Yuming Xia, Shenzhen (CN); Chongwei Tang, Shenzhen (CN)

(73) Assignee: HKC CORPORATION LIMITED, Shenzhen (CN)

( * ) Notice: Subject to any disclaimer, the term of this patent is extended or adjusted under 35 U.S.C. 154(b) by 212 days.

(21) Appl. No.: 17/357,961

(22) Filed: Jun. 24, 2021

(65) Prior Publication Data
US 2022/0089917 A1    Mar. 24, 2022

(30) Foreign Application Priority Data

Sep. 23, 2020 (CN) .......................... 202011011439.6

(51) Int. Cl.
| | |
|---|---|
| *C09J 9/02* | (2006.01) |
| *C09C 1/30* | (2006.01) |
| *C09C 1/36* | (2006.01) |
| *C09C 3/00* | (2006.01) |
| *C09C 3/06* | (2006.01) |
| *C09C 3/10* | (2006.01) |
| *C09J 7/30* | (2018.01) |

(52) U.S. Cl.
CPC .............. *C09J 9/02* (2013.01); *C09C 1/3054* (2013.01); *C09C 1/3072* (2013.01); *C09C 1/309* (2013.01); *C09C 1/3661* (2013.01); *C09C 1/3676* (2013.01); *C09C 3/006* (2013.01); *C09C 3/063* (2013.01); *C09C 3/10* (2013.01); *C09J 7/30* (2018.01); *C01P 2004/34* (2013.01); *C01P 2004/84* (2013.01); *C01P 2006/40* (2013.01); *C09J 2203/326* (2013.01); *C09J 2301/408* (2020.08)

(58) Field of Classification Search
CPC ..... C08F 112/08; C09C 3/063; C09C 1/3661; C09C 1/3054
See application file for complete search history.

(56) References Cited

FOREIGN PATENT DOCUMENTS

| | | | | |
|---|---|---|---|---|
| CN | 110380021 A | * | 10/2019 | ........ H01M 10/0525 |
| KR | 20120135691 A | * | 12/2012 | ............... B82B 1/00 |

* cited by examiner

*Primary Examiner* — Khanh T Nguyen (57) ABSTRACT

The disclosure relates to a conductive particle and a manufacturing method thereof, an adhesive and an application thereof. The conductive particle includes a core, a conductive carbon layer and a conductive polymer layer. The conductive carbon layer covers the core, and the conductive polymer layer is provided on the conductive carbon layer. The conductivity of the conductive particle is higher.

19 Claims, 5 Drawing Sheets

FIG. 6

CONDUCTIVE PARTICLE AND MANUFACTURING METHOD THEREOF, ADHESIVE AND APPLICATION THEREOF

CROSS REFERENCE TO RELATED APPLICATION

The present application claims priority to Chinese Patent Application No. 202011011439.6, filed on Sep. 23, 2020 and entitled "Conductive Particle and Manufacturing Method Thereof, Adhesive and Application Thereof", and the content of which is herein incorporated by reference in its entirety.

FIELD

The present disclosure relates to the field of conductive material technology, and particularly to a conductive particle and a manufacturing method thereof, an adhesive and an application thereof.

BACKGROUND

A sealant can bond a Thin Film Transistor (TFT) substrate and a Color Filter (CF) substrate to seal the liquid crystal and prevent water vapor from entering. In order to make a common electrode (an indium tin oxide electrode, i.e., ITO electrode) on the CF substrate be in communication with a common electrode on the TFT substrate, conductive particles need to be doped in the sealant. Generally, the communication between the common electrodes is implemented by dripping a silver colloid at a transfer point, that is, the silver is used as the conductive particles. However, a migration phenomenon of silver ions under moisture affects a conductivity of the silver colloid. In some studies, conductive particles are obtained by wrapping a layer of nickel and gold on a surface of a resin ball. The conductive particles provided in this way can avoid affecting the conductivity due to the migration of the silver ions under the moisture, but the conductivity is still lower, which cannot meet actual requirements.

SUMMARY

In view of this, it is necessary to provide a conductive particle with a higher conductivity.

In addition, a method for manufacturing a conductive particle, an adhesive and an application thereof are provided.

A conductive particle, includes:
a core;
a conductive carbon layer covering the core; and
a conductive polymer layer provided on the conductive carbon layer.

The above-mentioned conductive particle includes a core, a conductive carbon layer, and a conductive polymer layer. The conductive carbon layer covers the core, and the conductive polymer layer is provided on the conductive carbon layer. Both the conductive carbon material and the conductive polymer have a high conductivity. The arrangement of the conductive carbon layer and the conductive polymer layer can avoid affecting the conductivity due to the migration of silver ions under moisture, so that the conductive particle has a higher conductivity.

In an embodiment, a material of the conductive carbon layer has a carboxyl group, and the carboxyl group forms a chemical bond with the material of the conductive polymer layer.

In an embodiment, a material of the conductive polymer layer has an amino group, the amino group and the carboxyl group form an amide ester structure;

or, the material of the conductive polymer layer has a hydroxyl group, the hydroxyl group and the carboxyl group form an ester group structure;

or, the material of the conductive polymer layer contains a substance forms a bonding structure with the carboxyl group.

In an embodiment, the core includes a solid base and a porous layer coating the solid base, and the conductive carbon layer is at least partially received in the porous layer.

In an embodiment, the solid base is silica spheres, titanium dioxide spheres or polystyrene spheres;

and/or, the porous layer is a porous silica layer;

and/or, a thickness of the porous layer is in a range of 20 nm to 200 nm;

and/or, a pore size of the porous layer is in a range of 10 nm to 100 nm.

In an embodiment, the conductive carbon layer has a porous structure;

and/or, a material of the conductive polymer layer is a conductive polymer, and the conductive polymer is at least one of polyaniline and polypyrrole.

In an embodiment, a material of the conductive carbon layer is a nano-carbon material;

and/or, a material of the conductive polymer layer is a conductive polymer, and the conductive polymer is a nanowire.

In an embodiment, an outer diameter of the core is in a range of 0.2 μm to 2 μm;

and/or, a thickness of the conductive polymer layer is in a range of 0.1 μm to 0.5 μm;

and/or, a particle size of the conductive particle is in a range of 0.5 μm to 2 μm.

A method for manufacturing a conductive particle, includes:
forming a conductive carbon layer on a core;
forming a conductive polymer layer on the conductive carbon layer to obtain the conductive particle.

In an embodiment, the forming the conductive carbon layer on the core includes:
mixing and then curing the core with a carbon source to obtain a cured product; and
carbonizing the cured product to form the conductive carbon layer.

In an embodiment, the carbon source is at least one of an ethanol phenolic resin, an epoxy resin, a polyurethane and a polyurea resin;

and/or, a mass ratio of the core to the carbon source equals to 10: (0.1 to 0.9).

In an embodiment, the method further includes: before mixing and then curing the core with the carbon source to obtain the cured product, forming a porous layer on a solid base by a sol-gel method with using a pore former, an ethyl orthosilicate and water as raw materials, to obtain the core.

In an embodiment, the method further includes: after carbonizing the cured product to form the conductive carbon layer, acidizing a carbide formed by the carbonizing to form a carboxyl group on the conductive carbon layer.

In an embodiment, the forming the conductive polymer layer on the conductive carbon layer to obtain the conductive particle includes:
mixing and reacting the acidified carbide, a strong acid, a monomer, and an initiator to form the conductive polymer layer on the conductive carbon layer, and the carboxyl group and the material of the conductive polymer layer form a chemical bond to obtain the conductive particle, and the strong acid is H2SO4 or HClO4, the monomer is at least one of aniline and pyrrole, and the initiator is persulfate.

In an embodiment, the forming the conductive polymer layer on the conductive carbon layer to obtain the conductive particle includes:

dissolving the initiator in the strong acid to obtain an initiator solution;

dispersing the acidified carbide in the strong acid, adding the monomer and mixing to obtain a dispersion; and adding the initiator solution into the dispersion, and performing a polymerization reaction at a temperature of 0° C. to 5° C. to obtain the conductive particle.

An adhesive, includes a conductive material including at least one of the conductive particle in the above embodiments and the conductive particle manufactured by the method for manufacturing the conductive particle in the above embodiments.

In an embodiment, the adhesive is anisotropic conductive film or a sealant.

In an embodiment, the adhesive includes 5 to 20 parts of the conductive material, 40 to 70 parts of a resin, and 10 to 25 parts of a curing agent in terms of parts by mass.

In an embodiment, the adhesive further includes at least one of 1 to 3 parts of a flatting agent, 0.5 to 2 parts of a defoaming agent and 5 to 20 parts of a filler in terms of parts by mass.

An application of the adhesive in manufacturing of an electronic product is provided.

DETAILED DESCRIPTION

In order to facilitate the understanding of the present disclosure, the present disclosure will be described more comprehensively below with reference to relevant accompanying drawings which show some embodiments of the present disclosure. However, the present disclosure can be implemented in many different forms and is not limited to the embodiments described herein. Rather, the purpose of these embodiments is to provide a more thorough and comprehensive understanding of the present disclosure.

Figure 1:
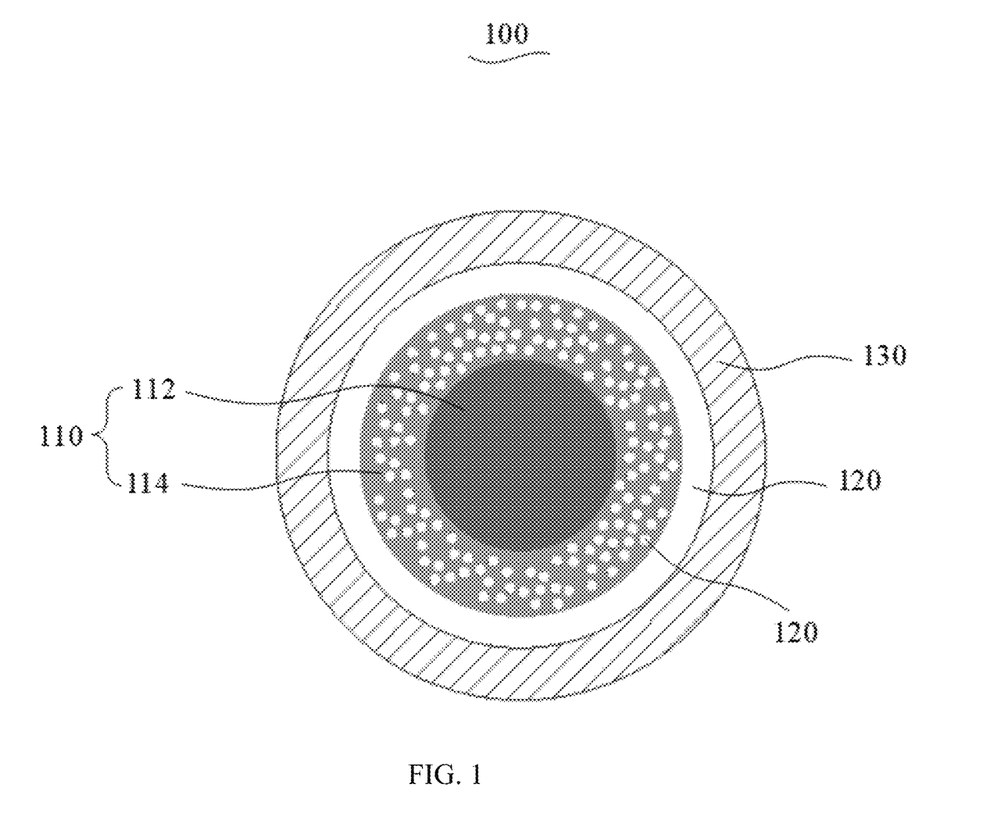
FIG. 1 is a schematic structure diagram of a conductive particle according to an embodiment of the present disclosure.

As shown in FIG. 1, a conductive particle 100 according to an embodiment has a higher conductivity and can be configured to manufacture an Anisotropic Conductive Film (ACF) or a sealant. In one embodiment, the conductive particle 100 includes a core 110, a conductive carbon layer 120 and a conductive polymer layer 130. The conductive carbon layer 120 covers the core 110, and the conductive polymer layer 130 is provided on the conductive carbon layer 120.

Both the conductive carbon layer 120 and the conductive polymer layer 130 have a higher conductivity. The conductive carbon layer 120 and the conductive polymer layer 130 are provided to make the conductive particle 100 have the higher conductivity.

In an embodiment, a material of the core 110 is silicon dioxide. Further, the core 110 is silica spheres. It should be noted that the material of the core 110 is not limited to the silicon dioxide, and may also be other materials, and titanium dioxide or polystyrene.

In an embodiment, the core 110 includes a solid base 112 and a porous layer 114 coating the solid base 112. The conductive carbon layer 120 is at least partially received in the porous layer 114. By providing the solid base 112 and the porous layer 114, a strength of the composite core can be increased and a compressive strength of the conductive particle 100 can be improved by means of the solid base 112; and by at least partially receiving the conductive carbon layer 120 in the porous layer 114, the conductive carbon layer 120 and the core 110 can be more firmly combined, and a stability of the conductive particle 100 is guaranteed.

In an embodiment, the material of the solid base 112 is silicon dioxide. The material of the porous layer 114 is silicon dioxide. It should be noted that the material of the solid base 112 is not limited to the silicon dioxide, and may also be other materials, and titanium dioxide or polystyrene. It should be noted that the material of the porous layer 114 is not limited to the silicon dioxide, and may also be other materials, and titanium dioxide or polystyrene. Further, the solid base 112 is silica spheres, titanium dioxide spheres or polystyrene spheres.

In one embodiment, the solid base 112 is silica spheres. The porous layer 114 is a porous silica layer. Such arrangement can improve a mechanical strength of the conductive particle 100. In one embodiment, the solid base 112 includes a hydroxyl group. The porous layer 114 includes a hydroxyl group.

In an embodiment, a thickness of the porous layer 114 is in a range of 20 nm to 200 nm. Such arrangement can ensure the mechanical strength of the core 100 and increase the loading capacity of the conductive carbon layer 120.

In an embodiment, a pore diameter of the porous layer 114 is in a range of 10 nm to 100 nm. Such arrangement can ensure the mechanical strength of the core 100 and increase the loading capacity of the conductive carbon layer 120.

In an embodiment, an outer diameter of the core 110 is in a range of 0.2 μm to 2 μm. Generally, the conductive particle 100 has a larger particle size and fewer surface contact points, which can reduce the number of particles in each electrode, and easily cause the conductive particles 100 of adjacent electrodes to contact and short-circuit. At the same time, the larger particle size requires more conductive particles 100 to be added to increase the conductivity, resulting in an increase in material cost. Such arrangement enables the particle size of the conductive particle 100 to be controlled, so that the conductive particle 100 is easy to disperse, avoiding short circuit due to contact between adjacent electrodes, and a small amount of conductive particles 100 can be utilized to obtain a higher conductivity, and accordingly the material cost is lower.

Since each carbon atom is connected to three other carbon atoms, the arrangement is honeycomb-like multiple hexagons. Since each carbon atom emits an electron, these electrons can move freely, which makes the carbon material conductive. At the same time, the carbon material is cheap, and has stable chemical properties, low relative density, and good dispersion, etc., accordingly the conductive particle 100 with a better stability and a lower relative density can be obtained.

In an embodiment, the conductive carbon layer 120 is at least partially received in the porous layer 114. In some embodiments, the conductive carbon layer 120 coats the porous layer 114 and is partially received in the porous layer 114. With such arrangement, the conductive carbon layer 120 can be connected to the core 110 without filling with the resin, and the conductive carbon layer 120 is received in the porous layer 114 so that the conductive carbon layer 120 is connected to the core 110 more firmly, and the stability of the conductive particle 100 is guaranteed.

In an embodiment, the conductive carbon layer 120 has a porous structure. Such arrangement can increase a specific surface area of the conductive carbon layer 120, so that the material in the conductive polymer layer 130 can be received in the pores of the conductive carbon layer 120, and the conductive polymer layer 130 and the conductive carbon layer 120 are more firmly combined, and the conductive carbon layer can combine more materials of the conductive polymer layer 130, accordingly the stability and conductivity of the conductive particle 100 is improved. Further, the pore diameter of the conductive carbon layer 120 is in a range of 20 nm to 100 nm. Such arrangement can not only ensure the loading capacity of the conductive carbon layer 120 on the core 110, but also enable more materials of the conductive polymer layer 130 to be received in the pores of the conductive carbon layer 120.

In an embodiment, the material of the conductive carbon layer 120 is a nano-carbon material. Ordinary carbon materials, due to low conductivity, difficult processing, and easy oxidation and other problems, seriously limit the use of carbon materials. The nano-carbon material refers to a carbon material with at least one dimension less than 100 nm in a dispersed phase scale, which can be obtained by nano-sized carbon materials. The nano-carbon material has a higher conductivity, and can further improve the conductivity of the conductive particle 100.

In an embodiment, the material of the conductive carbon layer 120 is a carbon nanosphere or a carbon nanotube. Further, the material of the conductive carbon layer 120 is a porous nano-carbon sphere. The porous nano-carbon sphere has a higher conductivity and can increase the specific surface area of the conductive carbon layer 120.

Conductive polymer is a type of polymer material which is chemically or electrochemically "doped" from an insulator to a conductor by a polymer with a conjugated π-bond. The conductive polymer has a very high conductivity, and at the same time, chemical groups on the surface thereof can be well compatible with an organic material. The organic material is an epoxy resin or an acrylic resin.

In an embodiment, the conductive carbon layer 120 includes a carboxyl group, and the carboxyl group can form a chemical bond with the material of the conductive polymer layer 130. With such arrangement, the conductive polymer layer 130 can be connected to the conductive carbon layer 120 more firmly, to increase the stability of the conductive particle 100. Further, the conductive polymer layer 130 includes an amino group; the amino group and carboxyl group can form an amide ester structure. It should be noted that the conductive polymer layer 130 is not limited to forming the amide ester structure through the amino group and the carboxyl group, and the conductive polymer layer 130 may also include a hydroxyl group, and the hydroxyl group and the carboxyl group form an ester group structure.

In an embodiment, the material of the conductive polymer layer 130 is a conductive polymer, and the conductive polymer includes at least one of polyaniline and polypyrrole. With such arrangement, the conductive polymer layer 130 includes an amino group to connect the conductive polymer layer 130 and the conductive carbon layer 120 through an amide ester structure formed by the amino group and the carboxyl group, and increasing the stability of the conductive particle 100.

In an embodiment, the material of the conductive polymer layer 130 is a conductive polymer, and the conductive polymer is a nanowire. The nanowire has a higher conductivity, stronger mechanical strength and a better toughness, and is beneficial to improve the conductivity, mechanical strength, and toughness of the conductive particle 100. Further, the material of the conductive polymer layer 130 includes at least one of a polyaniline nanowire and a polypyrrole nanowire.

In an embodiment, the thickness of the conductive polymer layer 130 is in a range of 0.1 μm to 0.5 μm. With such arrangement, the conductive particle 100 has a smaller particle size and the conductivity of the conductive particles 100 can be guaranteed.

In an embodiment, the particle size of the conductive particle 100 is in a range of 0.5 μm to 2 μm. Such arrangement makes the conductive particle 100 easy to disperse and have a higher conductivity.

The above-mentioned conductive particle 100 includes the core 110, the conductive carbon layer 120 and the conductive polymer layer 130. The conductive carbon layer 120 covers the core 110. The conductive polymer layer 130 is provided on the conductive carbon layer 120. The conductive carbon material and the conductive polymer have a higher conductivity, and the arrangement of the conductive carbon layer 120 and the conductive polymer layer 130 makes the conductive particle 100 have a higher conductivity.

Generally, a conductive silver adhesive is used as a sealant, and silver ions migrate under moisture, which affects the conductivity. In addition, the conductive silver adhesive requires a large amount of silver used in the manufacture, resulting in a higher material cost. In some studies, a sealant including Ni/Au is used, the material cost has been reduced, but Au is a noble metal, the price thereof is very expensive, the cost is still very high, and the conductivity of this kind of sealant is also reduced compared to the conductive silver adhesive. The conductive particle 100 in the above embodiment adopts the conductive carbon material and the conductive polymer as the conductive material. The low price of the conductive carbon material is beneficial to reduce the material cost of the conductive particle 100. The chemical stability of the conductive carbon material is higher, and the conductive polymer layer 130 is connected to an active group through a chemical bond, which can improve the stability of the conductive particle 100, and the above conductive particle 100 can be utilized to manufacture the sealant and ACF.

Furthermore, the compressive strength of the conductive particle is too large and is not easy to crush, which affects an electrical connection of an electronic product needing to be electrically connected by the conductive particle; and the compressive strength of the conductive particle is too small, which affects a service life of an electronic product which is electrically connected by the conductive particle, accordingly the actual demand cannot be satisfied. Generally, an optimum value of the compressive strength of the conductive particle is in a range of 70 MPa to 100 MPa. In the above conductive particle 100, by providing the solid base 112 and the porous layer 114, the conductive carbon layer 120 is at least partially received in the porous layer 114, and the conductive carbon layer 120 can be connected to the core 110 without filling with a resin, and the strength of the conductive particle 100 can be increased and the compressive strength of the conductive particle 100 can be improved by means of the solid base 112. Furthermore, when conductive particles 100 are made into an adhesive and sealant or ACF, it is necessary to mix the conductive particles 100 with an organic material. The commonly used conductive particles 100 have dissatisfied compatibility with organic materials, resulting in dissatisfied bonding effect and coating effect of the adhesive. In the conductive particle 100 of the above embodiment, by providing the conductive polymer layer 130 on the conductive carbon layer 120, the conductive polymer has good compatibility with the organic materials, and the conductive particle 100 can be better compatible with the organic materials to guarantee the bonding effect and coating effect of the adhesive.

Further, the commonly used conductive particle 100 has a larger particle size and fewer surface contact points, which may reduce the number of particles in each electrode, and easily cause adjacent electrodes to contact and short-circuit. At the same time, the larger particle size requires more conductive particles 100 to increase the conductivity of the adhesive, which further increases the material cost. The conductive particle 100 in the above embodiment can control the particle size of the conductive particle 100 by controlling the outer diameter of the core 110, the thickness of the conductive carbon layer 120, and the thickness of the conductive polymer layer 130. Therefore, the particle size of the conductive particle 100 can be controlled in a smaller range to avoid short circuit caused by the contact of adjacent electrodes; and a small amount of conductive particles 100 are utilized to obtain a higher conductivity, the material cost is lower, and the smaller particle size is beneficial to improve the dispersibility of the conductive particles 100, and the conductive particle 100 can be better compatible with organic materials.

Finally, the conductive particle 100 in the above embodiment has characteristics of both conductive carbon material and conductive polymer, and has a better chemical stability, a high strength and a low material cost, and the relative density of the conductive carbon material and the conductive polymer is small, and the relative density of the conductive particles 100 is relatively small, accordingly the conductive particles 100 can be utilized in a display panel to increase the competitiveness of the display panel.

Referring to FIG. 1 again, a method for manufacturing a conductive particle 100 according to an embodiment is further provided, which can manufacture a conductive particle 100 with a higher conductivity. In one embodiment, the method for manufacturing the conductive particle 100 includes the following steps S110 to S120.

S110: A conductive carbon layer 120 is formed on a core 110.

In an embodiment, a material of the core 110 is silicon dioxide. Further, the core 110 is silica spheres. It should be noted that the material of the core 110 is not limited to the silicon dioxide, but may also be other materials, and titanium dioxide or polystyrene.

In an embodiment, the core 110 includes a solid base 112 and a porous layer 114 coating the solid base 112. The conductive carbon layer 120 is at least partially received in the porous layer 114. By providing the solid base 112 and the porous layer 114, the strength of the composite core can be increased and the compressive strength of the conductive particle 100 can be improved by means of the solid base 112; and by at least partially receiving the conductive carbon layer 120 into the porous layer 114, the conductive carbon layer 120 and the core 110 are more firmly combined, and the stability of the conductive particle 100 is guaranteed.

In an embodiment, the material of the solid base 112 is silicon dioxide. The material of the porous layer 114 is silicon dioxide. It should be noted that the material of the solid base 112 is not limited to the silicon dioxide, but may also be other materials, and titanium dioxide or polystyrene. It should be noted that the material of the porous layer 114 is not limited to the silicon dioxide, but may also be other materials, and titanium dioxide or polystyrene. Further, the solid base 112 is silica spheres, titanium dioxide spheres or polystyrene spheres.

In one embodiment, the solid base 112 is silica spheres. The porous layer 114 is a porous silica layer. Such arrangement can improve the mechanical strength of the conductive particle 100. In one embodiment, the solid base 112 includes a hydroxyl group. The porous layer 114 includes a hydroxyl group.

In an embodiment, the thickness of the porous layer 114 is in a range of 20 nm to 200 nm. Such arrangement can guarantee the mechanical strength of the core 100 and increase the loading capacity of the conductive carbon layer 120.

In an embodiment, the pore size of the porous layer 114 is in a range of 10 nm to 100 nm. Such arrangement can guarantee the mechanical strength of the core 100 and increase the loading capacity of the conductive carbon layer 120.

In an embodiment, the outer diameter of the core 110 is in a range of 0.2 μm to 2 μm. Generally, the conductive particle 100 has a larger particle size and fewer surface contact points, which reduces the number of particles in each electrode, and easily causes the conductive particles 100 of adjacent electrodes to contact and short-circuit. At the same time, the larger particle size requires more conductive particles 100 to be added to increase the conductivity, resulting in an increase in the material cost. Such arrangement enables the particle size of the conductive particles 100 to be controlled, so that the conductive particles 100 are easy to disperse, avoiding short circuits due to contact between adjacent electrodes, and a small amount of conductive particles 100 can be used to obtain a higher conductivity, and accordingly the material cost is lower.

Since each carbon atom is connected to three other carbon atoms, the arrangement mode is honeycomb-like multiple hexagons. Since each carbon atom emits an electron, these electrons can move freely, which makes the carbon material conductive. At the same time, the carbon material is cheap, and has stable chemical properties, a low relative density, a good dispersion, etc., and accordingly a conductive particle 100 with a better stability and a lower relative density can be obtained.

In an embodiment, the conductive carbon layer 120 is at least partially received in the porous layer 114. In other embodiments, the conductive carbon layer 120 coats the porous layer 114 and is partially received in the porous layer 114. With such arrangement, the conductive carbon layer 120 can be connected to the core 110 without filling with a resin, and the conductive carbon layer 120 is received in the porous layer 114 and the conductive carbon layer 120 is connected to the core 110 more firmly, and the stability of the conductive particle 100 is guaranteed.

In an embodiment, the conductive carbon layer 120 has a porous structure. Such arrangement can increase a specific surface area of the conductive carbon layer 120, and the material in the conductive polymer layer 130 can be received in the pores of the conductive carbon layer 120, so that the conductive polymer layer 130 and the conductive carbon layer 120 are more firmly combined, the conductive carbon layer can combine more materials of the conductive polymer layer 130, and accordingly the stability and conductivity of the conductive particle 100 are improved. Further, the pore diameter of the conductive carbon layer 120 is in a range of 20 nm to 100 nm. Such arrangement can not only guarantee the loading capacity of the conductive carbon layer 120 on the core 110, but also make more materials of the conductive polymer layer 130 received in the pores of the conductive carbon layer 120.

In an embodiment, the material of the conductive carbon layer 120 is a nano-carbon material. Ordinary carbon materials, due to lower conductivity, difficult processing, and easy oxidation, severely restrict the use of carbon materials. The nano-carbon material refers to a carbon material with at least one dimension less than 100 nm in a dispersed phase scale, which can be obtained by the nano-sized carbon material. The nano-carbon material has a higher conductivity, and can further improve the conductivity of the conductive particle 100.

In an embodiment, the material of the conductive carbon layer 120 is a carbon nanosphere or a carbon nanotube. Further, the material of the conductive carbon layer 120 is a porous nano-carbon sphere. The porous nano-carbon sphere has a higher conductivity and can increase the specific surface area of the conductive carbon layer 120.

Figure 2:
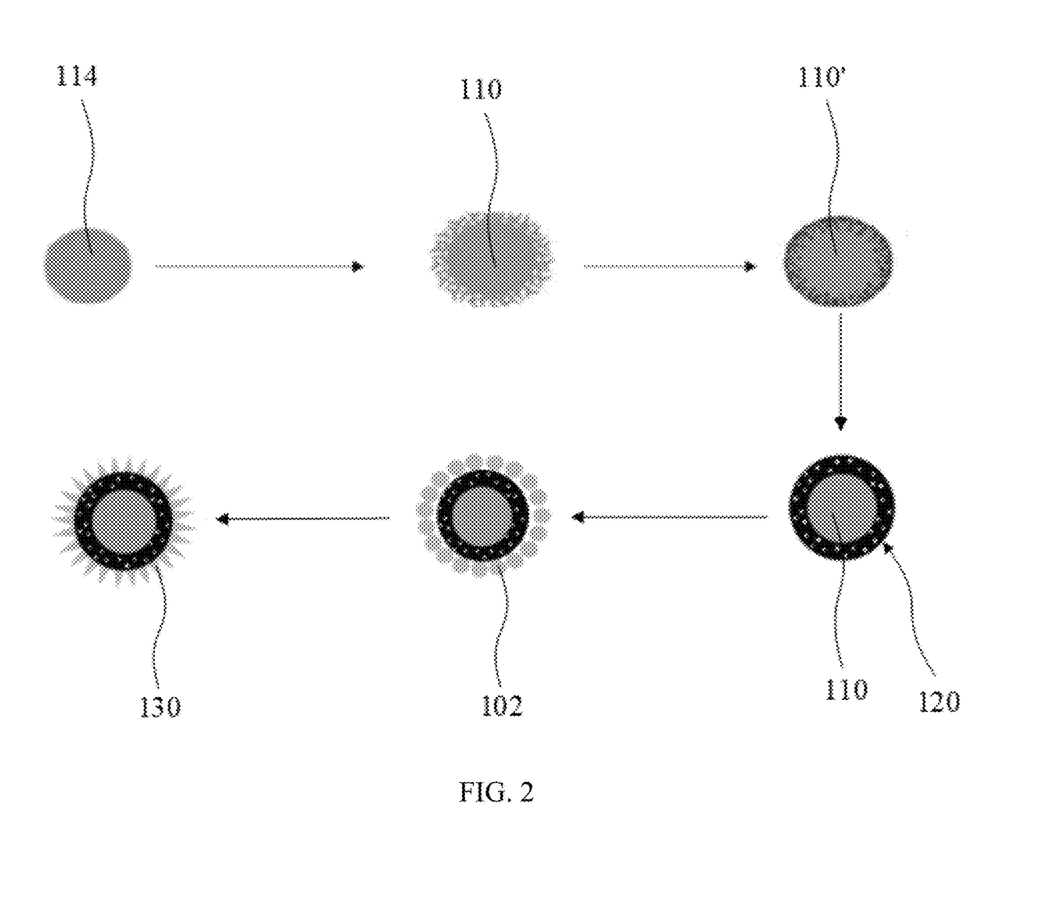
FIG. 2 is a flow chart showing a method for manufacturing the conductive particle as shown in FIG. 1.

Referring to FIG. 2, in an embodiment, the step S110 includes the following steps S111 to S112.

S111: the core 110 and a carbon source are mixed and cured to obtain a cured product 110'.

In an embodiment, the carbon source includes at least one of a ethanol phenolic resin, an epoxy resin, a polyurethane and a polyurea resin.

In an embodiment, a mass ratio of the core 110 to the carbon source equals to 10:(0.1-0.9).

Further, the step of S111 includes: the core 110 is added into the carbon source at a temperature of 10° C. to 30° C., to stir at a speed of 300 rpm to 600 rpm for 5 h to 10 h to obtain a mixture; the mixture is processed at a temperature of 100° C. to 150° C. for 10 h to 24 h, to obtain a cured product 110'. Furthermore, at a temperature of 10° C. to 30° C., 10 g of core 110 is added into 1 g to 3 g of a carbon source aqueous solution with a mass percentage of 10% to 30%, to stir for 5 h to 10 h at the speed of 300 rpm to 600 rpm to obtain a mixture; the mixture is processed at a temperature of 100° C. to 150° C. for 10 h to 24 h to obtain the cured product 110'.

In an embodiment, before the step S111, the method further includes a step of manufacturing the core 110, i.e., a pore former, ethyl orthosilicate and water are taken as raw materials, a porous layer 114 is formed on the solid base 112 by a sol-gel method, to obtain the core 110. Furthermore, the pore former, ethyl orthosilicate, water and a co-solvent are taken as raw materials, the porous layer 114 is formed on the solid base 112 by the sol-gel method to obtain the core 110. The pore former is octadecyl trimethoxy silane. The co-solvent is ethanol. A molar ratio of the pore former to the ethyl orthosilicate equals to 1:(5-20). It should be noted that the pore former is not limited to the above-mentioned substances, and can also be other pore formers. It should be noted that the co-solvent is not limited to the above-mentioned substances, and can also be other co-solvents, and polyethylene oxide-polypropylene oxide-polyethylene oxide triblock copolymer, poly (ethylene glycol)-block poly (propylene glycol)-block poly (ethylene glycol) and so on.

In one embodiment, 10 g of the solid base 112 is dispersed in an aqueous solution containing a co-solvent at a temperature of 10° C. to 30° C., 5 mL to 30 mL of a premixed reagent is added, which are stirred at a speed of 300 rpm to 800 rpm for 4 h to 6 h, and calcined to obtain the core 110. The solid base 112 is silica spheres. The premixed reagent includes a pore former and ethyl orthosilicate with a molar ratio of 1:(5-20). In the aqueous solution containing the co-solvent, the co-solvent is ethanol, and a volume ratio of water to the co-solvent equals to 1:(0.5-2). The conditions of calcination are as follows: heating at 5° C./min to 10° C./min to a temperature of 550° C. to 700° C., and maintaining at the temperature of 550° C. to 700° C. for 2 h to 4 h.

It should be noted that the core 110 is not limited to be manufactured by the above steps, but may also be a commercial core 110, and commercially available silica spheres, commercially available titanium dioxide spheres, or commercially available polystyrene spheres.

S112: the cured product 110' is carbonized to form a conductive carbon layer 120.

In an embodiment, the step S112 includes: the cured product 110 is processed at a temperature of 600° C. to 800° C. for 2 h to 6 h under a protective gas atmosphere to form the conductive carbon layer 120. The protective gas includes at least one of nitrogen, helium and argon.

In an embodiment, after the step S112, the method further includes that the carbonized carbide is acidified, so that a carboxyl group is formed on the conductive carbon layer 120. In one embodiment, the carbonized carbide is put into HNO$_3$ aqueous solution with a molar mass of 0.5M to 5M, and stirred at a temperature of 50° C. to 80° C. and at a speed of 300 rpm to 600 rpm for 2 h to 5 h, so that the carboxyl group is formed on the conductive carbon layer 120. In one embodiment, in a protective gas atmosphere, 2 g to 4.5 g of the carbonized carbide is put in 50 mL to 100 mL of HNO$_3$ aqueous solution with a molar mass of 0.5M to 5M, and stirred at a temperature of 50° C. to 80° C. and at a speed of 300 rpm to 600 rpm for 2 h to 5 h to form the carboxyl group on the conductive carbon layer 120.

It should be noted that the acidification process can be omitted. At this time, the conductive carbon layer 120 does not contain the carboxyl group.

S120: a conductive polymer layer 130 is formed on the conductive carbon layer 120 to obtain a conductive particle 100.

In an embodiment, the conductive carbon layer 120 includes a carboxyl group, and the carboxyl group can form a chemical bond with the material of the conductive polymer layer 130. With such arrangement, the conductive polymer layer 130 can be connected to the conductive carbon layer 120 more firmly, to increase the stability of the conductive particle 100. Further, the conductive polymer layer 130 includes an amino group, and the amino group and carboxyl group form an amide ester structure. It should be noted that the conductive polymer layer 130 is not limited to the amide ester structure formed by the amino group and the carboxyl group. The conductive polymer layer 130 may further include a hydroxyl group, the hydroxyl group and the carboxyl group form an ester structure, or other substances that can form a bonding structure with the carboxyl group.

In an embodiment, the material of the conductive polymer layer 130 is a conductive polymer, and the conductive polymer includes at least one of polyaniline and polypyrrole. With such arrangement, the conductive polymer layer 130 includes an amino group to connect the conductive polymer layer 130 and the conductive carbon layer 120 through the amide ester structure formed by the amino group and the carboxyl group, and increasing the stability of the conductive particle 100.

In an embodiment, the material of the conductive polymer layer 130 is a conductive polymer, and the conductive polymer is a nanowire. The nanowire has a higher conductivity, a stronger mechanical strength and a better toughness, which are beneficial to improve the conductivity, the mechanical strength, and the toughness of the conductive particle 100. Further, the material of the conductive polymer layer 130 includes at least one of a polyaniline nanowire and a polypyrrole nanowire.

In an embodiment, the thickness of the conductive polymer layer 130 is in a range of 0.1 μm to 0.5 μm. With such arrangement, the conductive particle 100 has a smaller particle size, and the conductivity of the conductive particle 100 can be guaranteed.

In an embodiment, the particle size of the conductive particle 100 is in a range of 0.5 μm to 2 μm. Such arrangement makes the conductive particle 100 easy to disperse and have a higher conductivity.

In an embodiment, the step S120 includes: the core 110 provided with the conductive carbon layer 120, strong acid, a monomer 102, and an initiator are mixed and react to form the conductive polymer layer 130 on the conductive carbon layer 120 to obtain the conductive particle 100. The strong acid is $H_2SO_4$ or $HClO_4$. The monomer 102 includes at least one of aniline and pyrrole. The initiator is persulfate. Further, the initiator is ammonium persulfate, sodium persulfate or potassium persulfate.

Further, the step S120 includes: the acidified carbide, the strong acid, the monomer 102, and initiator are mixed and react to form a conductive polymer layer 130 on the conductive carbon layer 120, and make the carboxyl group of the conductive carbon layer 120 form a chemical bond with the conductive polymer layer 130 to obtain the conductive particle 100.

Furthermore, the step S120 includes the following steps S121 to S123.

S121: the initiator is dissolved in the strong acid to obtain an initiator solution.

In one embodiment, 0.05 g to 0.3 g of the initiator is dissolved in 5 mL to 30 mL of the strong acid aqueous solution with a molar mass of 0.5M to 3M, and cooled to obtain the initiator solution.

S122: the core 110 provided with the conductive carbon layer 120 is dispersed in the strong acid, the monomer 102 is added and mixed well to obtain a dispersion.

Further, the acidified carbide is dispersed into the strong acid, and the monomer 102 is added and mixed to obtain a dispersion. In one embodiment, 0.05 g to 0.3 g of acidified carbide is dissolved in 10 mL to 50 mL of the strong acid aqueous solution with a molar mass of 0.5M to 3M and mixed, and 0.01 mL to 0.5 mL of monomer 102 is added and mixed to obtain the dispersion. In one embodiment, 0.05 g to 0.3 g of the acidified carbide is dissolved in 10 mL to 50 mL of the strong acid aqueous solution with the molar mass of 0.5M to 3M, and ultrasonicated for 10 min to 60 min, and then stirred at a temperature of 0° C. to 5° C. for 10 min to 40 min, 0.01 mL to 0.5 mL of the monomer 102 is added and ultrasonically mixed to obtain the dispersion.

S123: the initiator solution is added into the dispersion to react at a temperature of 0° C. to 5° C. to obtain the conductive particle 100.

In one embodiment, the initiator solution is added into the dispersion, and stirred at a temperature of 0° C. to 5° C. and at a speed of 300 rpm to 800 rpm for 3 h to 24 h to polymerize the monomer 102 to obtain the conductive particle 100. A mass ratio of the dispersion to the initiator solution is in a range of 10:1 to 100:1. Furthermore, after the step of adding the initiator solution into the dispersion and stirring at the temperature of 0° C. to 5° C. and at the speed of 300 rpm to 800 rpm for 3 h to 24 h to polymerize the monomer 102, the method further includes: the reaction product is washed by water and ethanol, and dried to obtain the conductive particle 100.

The above-mentioned method for manufacturing the conductive particle 100 can manufacture the conductive particle 100 with a higher conductivity. In addition, the material cost of the above-mentioned method for manufacturing the conductive particle 100 is lower, and the obtained conductive particle 100 has a better chemical stability, a higher strength, and a better compatibility with an organic material, and can be configured to manufacture the adhesive and sealant or ACF.

Therefore, an adhesive is further provided according to an embodiment, which includes a conductive material; the conductive material includes at least one of the conductive particle of the above embodiment and the conductive particle obtained by the method for manufacturing the conductive particle in the above embodiment. The adhesive has a higher conductivity and can be used as a sealant or ACF to manufacture electronic products.

In an embodiment, the adhesive includes 5 to 20 parts of conductive material, 40 to 70 parts of resin, and 10 to 25 parts of curing agent in terms of parts by mass.

The conductive material makes the adhesive conductive. In an embodiment, the adhesive includes 5 to 10 parts of conductive material in terms of parts by mass. In some embodiments, the adhesive includes 5 parts, 8 parts, 10 parts, 12 parts, 15 parts, 18 parts, or 20 parts of conductive material in terms of parts by mass.

The resin can make the adhesive sticky. In an embodiment, the resin includes at least one of an organic silicone resin, an acrylic resin and an epoxy resin. It should be noted that the resin is not limited to the substances indicated above, and may also be other resins that can be used for the adhesive. Further, the resin includes at least one of an organic silicone resin, a polyaryl organosilicon resin, a polyalkyl aryl organosilicon resin, an acrylic resin methyl methacrylate, an ethyl methacrylate, an n-butyl acrylate, a laurel acrylate, a methyl methacrylate, and a bisphenol A epoxy resin.

In an embodiment, the adhesive includes 50 to 60 parts of resin in terms of parts by mass. In some embodiments, the adhesive includes 40 parts, 45 parts, 50 parts, 55 parts, 60 parts, 65 parts, or 70 parts of resin in terms of parts by mass.

The curing agent enables the adhesive to cure. In an embodiment, the curing agent includes at least one of a normal temperature curing agent, a light curing agent, and a thermal curing agent. The light curing agent refers to a substance which can be cured by light. The thermal curing agent refers to a substance which is cured by changing a temperature. The normal temperature curing agent includes at least one of an aliphatic amine curing agent and an amidoamine curing agent. A high temperature curing agent includes at least one of an acid anhydride curing agent and an aromatic curing agent. The light curing agent includes a UV curing agent.

In an embodiment, the adhesive includes 12 to 20 parts of curing agent in terms of parts by mass. In some embodiments, the adhesive includes 10 parts, 12 parts, 15 parts, 18 parts, 20 parts, 22 parts, or 25 parts of curing agent in terms of parts by mass.

In an embodiment, the adhesive further includes at least one of 1 to 3 parts of flatting agent, 0.5 to 2 parts of defoaming agent, and 5 to 20 parts of filler in terms of parts by mass.

The flatting agent can promote the adhesive to form a flat, smooth and uniform film in the process of manufacturing the adhesive into a film. In an embodiment, the flatting agent includes at least one of a diacetone alcohol flatting agent, an acrylic flatting agent, an organosilicon flatting agent, and a fluorocarbon flatting agent.

In an embodiment, the adhesive includes 1.5 to 2.5 parts of flatting agent in parts by mass. In some embodiments, the adhesive includes 1 part, 1.5 parts, 2 parts, 2.5 parts, or 3 parts of flatting agent in terms of parts by mass.

The defoaming agent can suppress the foam in the adhesive so that the adhesive can form a smooth and flat surface after curing. In an embodiment, the defoaming agent includes at least one of organosiloxane, a polyether defoaming agent and an amide defoaming agent.

In an embodiment, the adhesive includes 1 to 1.5 parts of defoaming agent in parts by mass. In some embodiments, the adhesive includes 0.5 parts, 0.8 parts, 1 part, 1.2 parts, 1.5 parts, 1.8 parts, or 2 parts of defoaming agent in parts by mass.

A filler can increase the viscosity of the adhesive. In an embodiment, the filler is an inorganic filler. Further, the filler includes at least one of calcium carbonate, barium sulfate, mica powder, talc and alumina; and the particle size of the filler is in a range of 200 mesh to 2000 mesh. Furthermore, the mica powder is sericite powder.

In an embodiment, the adhesive includes 10 to 15 parts of filler in parts by mass. In some embodiments, the adhesive includes 5 parts, 8 parts, 10 parts, 12 parts, 15 parts, 18 parts, or 20 parts of filler in parts by mass.

In an embodiment, the adhesive includes 5 parts to 20 parts of conductive material, 40 parts to 70 parts of resin, 10 parts to 25 parts of curing agent, and 1 part to 3 parts of flatting agent, 0.5 parts to 2 parts of defoaming agent and 5 parts to 20 parts of filler in parts by mass. The proportion of the adhesive is reasonable, and the adhesive has a higher conductivity and a better adhesion. Further, the adhesive includes 5 parts to 10 parts of conductive material, 50 parts to 60 parts of resin, 12 parts to 20 parts of curing agent, 1.5 parts to 2.5 parts of flatting agent, 1 part to 1.5 parts of defoaming agent and 10 parts to 15 parts of filler in parts by mass.

In an embodiment, the adhesive is a paste or a film.

The above-mentioned adhesive includes at least one of the conductive particle of the above-mentioned embodiment and the conductive particle obtained by the method for manufacturing the conductive particle in the above-mentioned embodiment. The conductive particle has a higher conductivity to guarantee the conductivity of the adhesive. Furthermore, the above-mentioned conductive particle and the resin have better compatibility, so that the adhesive has a better dispersibility to guarantee the adhesive strength of the adhesive.

Further, the adhesive includes 5 parts to 20 parts of conductive material, 40 parts to 70 parts of resin, 10 parts to 25 parts of curing agent, 1 part to 3 parts of flatting agent, and 0.5 parts to 2 parts of defoaming agent and 5 parts to 20 parts of filler in parts by mass. This kind of adhesive has a reasonable proportion, a higher conductivity and a better adhesion.

Finally, since the above-mentioned adhesive has a higher conductivity and a better adhesion, which can be used as a sealant or ACF to bond and electrically connect the TFT substrate and the CF substrate, and can be applied to manufacture electronic products having a stronger tensile strength, a higher bonding yield and a longer operating life.

Figure 3:
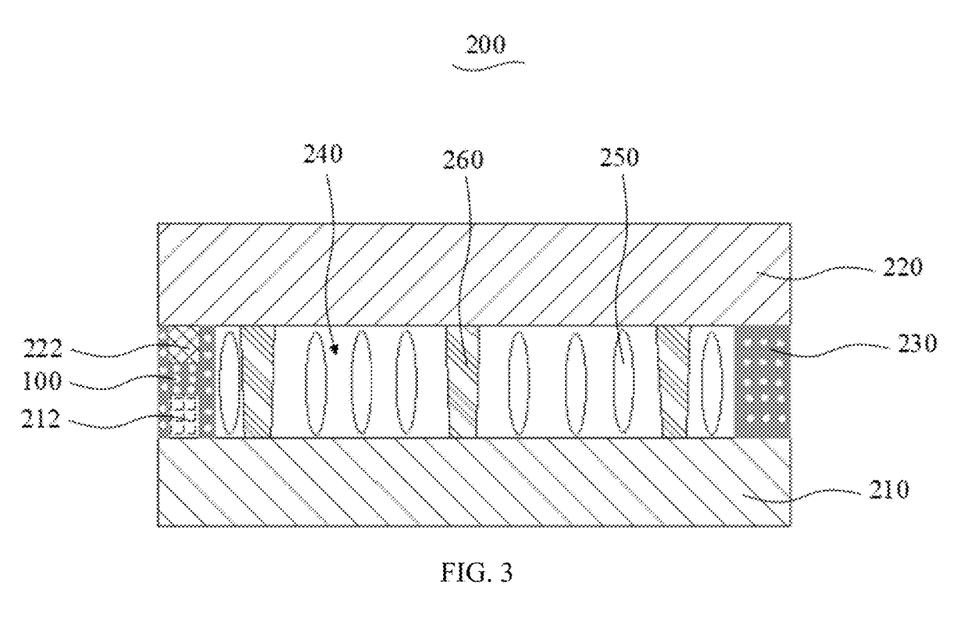
FIG. 3 is a schematic structure diagram of an electronic product according to an embodiment of the present disclosure.

Referring to FIG. 3, an electronic product 200 is provided in an embodiment, which includes a first member 210, a second member 220 and an adhesive layer 230. The adhesive layer 230 is provided between the first member 210 and the second member 220; the adhesive layer 230 is configured to bond the first member 210 and the second member 220, and the adhesive layer 230 is formed by curing the adhesive in the above embodiment. The above-mentioned electronic product 200 adopts the adhesive layer 230 formed by curing the adhesive in the above embodiment to bond the first member 210 and the second member 220. Since the adhesive has a higher conductivity and a better adhesion, so that the electronic product 200 has a stronger tensile strength, a high bonding yield and a longer operating life.

In an embodiment, the electronic product 200 is a display screen, a piezoelectric crystal, a crystal oscillator, a resonator, a solar cell, a photovoltaic cell, a buzzer, or a discrete semiconductor device, etc.

In an embodiment, the first member 210 is a glass plate, a TFT substrate, a CF substrate, a Chip on Flex or Chip On Film (COF) or a Flexible Printed Circuit (FPC). It should be noted that the first member 210 is not limited to the above-mentioned members, and may be other members, for example, Chips on Board (COB). In other embodiments, the first member 210 is a TFT substrate. The first member 210 has a first electrode 212.

In an embodiment, the second member 220 is a glass plate, a TFT substrate, a CF substrate, a COF or an FPC. It should be noted that the second member 220 is not limited to the above indicated members, and may be other members, and a COB. In some embodiments, the second member 220 is a CF substrate. The second member 220 is opposite to and spaced from the first member 210. The second member 220 has a second electrode 222. The position of the second electrode 222 is opposite to the position of the first electrode 212.

Further, the adhesive layer 230 bonds and electrically connects the first member 210 and the second member 220. In some embodiments, the adhesive layer 230 is provided on a side of the first member 210 adjacent to the second member 220, and is arranged around an edge of the first member 210. The second member 220 is provided on a side of the adhesive layer 230 away from the first member 210. The second member 220 and the first member 210 are matched with the adhesive layer 230 to form a receiving cavity 240. The conductive particle 100 is sandwiched between the first electrode 212 and the second electrode 222. The conductive particle 100 is electrically connected to the first electrode 212 and the second electrode 222. At this time, the adhesive is a sealant. It should be noted that the adhesive is not limited to the sealant, but may also be ACF.

In an embodiment, a mode in which the adhesive is cured to form the adhesive layer 230 includes at least one of heat curing, ultraviolet light curing, and pressure curing. A curing mode of the adhesive depends on a type of the curing agent in the adhesive. The curing mode is selected according to the type of the curing agent in the adhesive.

The electronic product 200 further includes liquid crystals 250. The liquid crystals 250 fill the receiving cavity 240. Furthermore, the electronic product 200 further includes a spacer 260. The spacer 260 separates the liquid crystals 250. Furthermore, the spacer 260 is received in the receiving cavity 240 and is fixed to the first substrate 210 and the second substrate 220. There are spacers 260 which are arranged at intervals.

In the above electronic product 200, the adhesive layer 230 formed by curing the adhesive in the above embodiment is utilized to bond the first member 210 and the second member 220. Since the adhesive has a higher conductivity and a better adhesion, so that the electronic product 200 has a stronger tensile strength, a high bonding yield, and a longer operating life.

Specific embodiments are provided as follows.

In the following embodiments, unless otherwise specified, "parts" all refer to parts by mass.

Embodiment I

1. A process of manufacturing a conductive particle in this embodiment is provided as follows.

(1) 10 g of the solid base is dispersed in an aqueous solution containing a co-solvent at a temperature of 10° C., with 5 mL of premixed reagent added, which are stirred at a speed of 300 rpm for 4 h, and heat up to a temperature of 700° C. at 5° C./min and is maintained at the temperature of 700° C. for 2 h, and then naturally cooled down to the room temperature to obtain the core. The solid base is silica spheres. The premixed reagent includes a pore former and ethyl orthosilicate in a molar ratio of 1:5. The pore former is octadecyl trimethoxy silane. In the aqueous solution containing the co-solvent which is ethanol, and the volume ratio of water to the co-solvent equals to 1:0.5.

(2) The core is added to the carbon source at a temperature of 30° C., and stirred at a speed of 600 rpm for 5 h to obtain a mixture. The mixture is processed at a temperature of 100° C. for 10 h to obtain a cured product. Under a protective gas atmosphere, the cured product is processed at the temperature of 600° C. for 2 h to obtain a carbide. 2 g of the carbide is put into 100 mL of $HNO_3$ aqueous solution with a molar mass of 0.5M, and stirred at a temperature of 80° C. and at a speed of 300 rpm for 2 h, and then washed and dried by deionized water to obtain an acidified carbide. The protective gas is nitrogen.

(3) 0.05 g of the initiator is dissolved in 5 mL of a strong acid aqueous solution with a molar mass of 0.5M, and then cooled to obtain an initiator solution. 0.5 g of the acidified carbide is dissolved in 10 mL of the strong acid aqueous solution with the molar mass of 0.5M, and sonicated for 10 min and then stirred at a temperature of 5° C. for 40 min, with 0.01 mL of monomer added, and then ultrasonically mixed to obtain a dispersion. The initiator solution is added to the dispersion and stirred at a temperature of 5° C. and at a speed of 800 rpm for 24 h to polymerize the monomer. The reaction product is washed with water and ethanol and dried to obtain the conductive particle. The mass ratio of the dispersion to the initiator solution equals to 10:1. The strong acid is $HClO_4$. The monomer is aniline. The initiator is ammonium persulfate.

2. The structure of the conductive particle in this embodiment is shown in FIG. 1. A diameter of the solid base is 0.8 μm. The porous layer is a silica layer, the thickness of the porous layer is 120 nm, and the pore size of the porous layer is 50 nm. The conductive carbon layer has a porous structure, and the thickness of the conductive carbon layer is 150 nm. The pore size of the conductive carbon layer is 40 nm. The material of the conductive polymer layer is a conductive polymer, and the conductive polymer is a polyaniline nanowire. The thickness of the conductive polymer layer is 200 nm.

3. The adhesive in this embodiment includes 5 parts of the conductive particle, 40 parts of the resin, and 10 parts of the curing agent in terms of parts by mass. The resin is a polyalkyl organosilicon resin. The curing agent is an aromatic curing agent.

Embodiment II

1. A process of manufacturing a conductive particle in this embodiment is provided as follows.

(1) 10 g of solid base is dispersed in an aqueous solution containing a co-solvent at a temperature of 30° C., with 30 mL of a premixed reagent added, which are stirred at a speed of 800 rpm for 6 h, and heat up to a temperature of 550° C. to 700° C. at 10° C./min, and maintained at a temperature of 500° C. for 4 h, and then naturally cooled down to the room temperature to obtain the core. The solid base is titanium dioxide spheres. The premixed reagent includes a pore former and ethyl orthosilicate in a molar ratio of 1:20. The pore former is polyethylene oxide-polypropylene oxide-polyethylene oxide. In the aqueous solution containing the co-solvent, the co-solvent is ethanol co-solvent, and the volume ratio of water to the co-solvent equals to 1:2.

(2) The core is added to the carbon source at a temperature of 10° C. and stirred at a speed of 300 rpm for 10 h to obtain a mixture. The mixture is processed at a temperature of 150° C. for 24 h to obtain a cured product. In a protective gas atmosphere, the cured product is processed at a temperature of 800° C. for 6 h to obtain a carbide. 4.5 g of the carbide is put into 50 mL of $HNO_3$ aqueous solution with molar mass of 5M, and stirred at a temperature of 50° C. and at a speed of 600 rpm for 5 h, and then washed and dried by deionized water to obtain an acidified carbide. The protective gas is helium.

(3) 0.03 g of the initiator is dissolved in 30 mL of a strong acid aqueous solution with a molar mass of 3M, and cooled to obtain an initiator solution. 0.6 g of the acidified carbide is dissolved in 50 mL of the strong acid aqueous solution with the molar mass of 3M, and sonicated for 60 min and then stirred at a temperature of 0° C. for 10 min, with 0.5 mL of monomer added, and ultrasonically mixed to obtain a dispersion. The initiator solution is added to the dispersion and stirred the temperature of at 0° C. and at a speed of 300 rpm for 3 h to polymerize the monomer. The reaction product is washed with water and ethanol and dried to obtain the conductive particle. The mass ratio of the dispersion to the initiator solution equals to 100:1. The strong acid is $H_2SO_4$. The monomer is pyrrole. The initiator is persulfate. The initiator is potassium persulfate.

2. The structure of the conductive particle in this embodiment is shown in FIG. 1. A diameter of the solid base is 1.2 μm. The porous layer is a silica layer, the thickness of the porous layer is 120 nm, and the pore size of the porous layer is 100 nm. The conductive carbon layer has a porous structure, and the thickness of the conductive carbon layer is 130 nm. The pore size of the conductive carbon layer is 50 nm. The material of the conductive polymer layer is a conductive polymer, and the conductive polymer is a polypyrrole nanowire. The thickness of the conductive polymer layer is 0.2 μm.

3. The adhesive in this embodiment includes 20 parts of conductive particle, 70 parts of resin, and 25 parts of curing agent in terms of parts by mass. The resin is bisphenol A epoxy resin. The curing agent is an aliphatic amine curing agent.

Embodiment III

1. A process of manufacturing a conductive particle in this embodiment is provided as follows.
(1) 10 g of solid base is dispersed in an aqueous solution containing a co-solvent at a temperature of 20° C., with 20 mL of premixed reagent added, which are stirred at a speed of 500 rpm for 5 h, heat up to a temperature of 620° C. at 7° C./min, and maintained at the temperature of 620° C. for 3 h and then naturally cooled down to the room temperature to obtain the core. The solid base is silica spheres. The premixed reagent includes a pore former and ethyl orthosilicate in a molar ratio of 1:12. The pore former is octadecyl trimethoxy silane. In the aqueous solution containing the co-solvent, the co-solvent is ethanol, and the volume ratio of water to the co-solvent equals to 1:1.2.
(2) The core is added to the carbon source at a temperature of 20° C. and stirred for at a speed of 450 rpm for 7 h to obtain a mixture. The mixture is processed at a temperature of 120° C. for 18 h to obtain a cured product. Under a protective gas atmosphere, the cured product is processed at a temperature of 700° C. for 4 h to obtain a carbide. 3 g of the carbide is put into 70 mL of $HNO_3$ aqueous solution with a molar mass of 2.5M, and stirred at a temperature of 70° C. and at a speed of 460 rpm for 3.5 h, and then washed and dried with deionized water to obtain an acidified carbide. The protective gas is nitrogen.
(3) 0.02 g of the initiator is dissolved in 20 mL of a strong acid aqueous solution with a molar mass of 1.5M, and cooled to obtain an initiator solution. 0.6 g of the acidified carbide is dissolved in 35 mL of the strong acid aqueous solution with the molar mass of 1.5M, and sonicated for 35 min and then stirred at a temperature of 2.5° C. for 25 min, with 0.3 mL of a monomer added, and ultrasonically mixed to obtain a dispersion. The initiator solution is added to the dispersion and stirred at a temperature of 2.5° C. and at a speed of 500 rpm for 14 h to polymerize the monomer. The reaction product is washed with water and ethanol and dried to obtain the conductive particle. The mass ratio of the dispersion to the initiator solution equals to 30:1. The strong acid is $HClO_4$. The monomer is aniline. The initiator is ammonium persulfate.
2. The structure of the conductive particle in this embodiment is shown in FIG. 1. The diameter of the solid base is 1.5 μm. The porous layer is a silica layer, the thickness of the porous layer is 120 nm, and the pore size of the porous layer is 60 nm. The conductive carbon layer has a porous structure, and the thickness of the conductive carbon layer is 150 nm. The pore size of the conductive carbon layer is 50 nm. The material of the conductive polymer layer is conductive polymer, and the conductive polymer is nanowire. The thickness of the conductive polymer layer is 0.3 μm.
3. The adhesive in this embodiment includes 13 parts of conductive particle, 55 parts of resin, and 17 parts of curing agent in terms of parts by mass. The resin is acrylic resin methyl methacrylate. The curing agent is a UV curing agent.

Embodiment IV

1. A conductive particle in this embodiment and a manufacturing method thereof are the same as those in the Embodiment I.

2. The adhesive in this embodiment is substantially the same as that in the Embodiment I, except that the adhesive in this embodiment further includes 1 part of flatting agent and 0.5 parts of defoaming agent and 5 parts of filler in terms of parts by mass. The flatting agent is diacetone alcohol flatting agent. The defoaming agent is organosiloxane. The filler is calcium carbonate.

Embodiment V

1. A conductive particle in this embodiment and a manufacturing method thereof are substantially the same as those in the Embodiment I, except that the solid base is polyethylene spheres.
2. The adhesive in this embodiment is substantially the same as that in the Embodiment II, except that the adhesive in this embodiment further includes 3 parts of flatting agent, 2 parts of defoaming agent and 20 parts of filler in terms of parts by mass. The resin is ethyl methacrylate. The curing agent is an amidoamine curing agent. The flatting agent is an acrylic flatting agent. The defoaming agent is a polyether defoaming agent. The filler is talc.

Embodiment VI

1. A conductive particle in this embodiment and a manufacturing method thereof are substantially the same as those in the Embodiment III.
2. The adhesive in this embodiment is substantially the same as that in the Embodiment III, except that the adhesive in this embodiment further includes 2 parts of flatting agent, 1.2 parts of defoaming agent and 13 parts of filler in terms of parts by mass. The flatting agent is an organosilicone flatting agent. The defoaming agent is an amide defoaming agent. The filler is sericite powder.

Embodiment VII

1. A process of manufacturing a conductive particle in this embodiment is provided as follows.
(1) The core is manufactured according to the operation in the step (1) of the Embodiment III.
(2) 0.2 g of carbon nanotubes are dispersed in 50 mL of a mixed solution of water and ethanol at a temperature of 25° C., with 2.8 g of the core added, and stirred at a speed of 450 rpm for 4 h, and then dried at a temperature of 100° C. for 12 h to obtain a dried product. 3 g of carbide is put into 70 mL of $HNO_3$ aqueous solution with a molar mass of 2.5M, and stirred at a temperature of 70° C. and at a speed of 460 rpm for 3.5 h, and then washed and dried with deionized water to obtain an acidified carbide. The carbon nanotube is a single-walled carbon nanotube. The length of the carbon nanotube is 500 nm.
(3) The conductive particle is manufactured according to the operation in the step (1) of the Embodiment III.
2. The structure of the conductive particle in this embodiment is substantially the same as that in the Embodiment VI, except that the conductive carbon layer is a carbon nanotube layer.
3. The formulation of the adhesive in this embodiment is the same as that in the Embodiment VI.

Embodiment VIII

1. A process of manufacturing a conductive particle in this embodiment is provided as follows.

(1) The core is added to the carbon source at a temperature of 20° C. and stirred at a speed of 450 rpm for 7 h to obtain a mixture. The mixture is processed at a temperature of 120° C. for 18 h to obtain a cured product. In a protective gas atmosphere, the cured product is processed at a temperature of 700° C. for 4 h to obtain a carbide. 3 g of the carbide is put into 70 mL of $HNO_3$ aqueous solution with a molar mass of 2.5M and stirred at a temperature of 70° C. and at a speed of 460 rpm for 3.5 h, and then washed and dried with deionized water to obtain an acidified carbide. The protective gas is nitrogen. The core is commercially available solid silica spheres.

(2) A conductive particle is manufactured according to the operation in the step (3) of the Embodiment III.

2. The structure of the conductive particle in this embodiment is substantially the same as that in the Embodiment III, except that the core is solid silica spheres.

3. The formulation of the adhesive in this embodiment is the same as that in the Embodiment VI.

Embodiment IX

1. A process of manufacturing a conductive particle in this embodiment is provided as follows.

(1) The core is put into 70 mL of $HNO_3$ aqueous solution with a molar mass of 2.5M, and stirred at a temperature of 70° C. and at a speed of 460 rpm for 3.5 h, and then washed and dried with deionized water to obtain an acidified carbide. The core is commercially available carbon silicon spheres.

(2) The conductive particle is manufactured according to the operation in the step (3) of the Embodiment III.

2. The formulation of the adhesive in this embodiment is the same as that in the Embodiment VI.

Embodiment X

1. A process of manufacturing a conductive particle in this embodiment is provided as follows.

(1) the core is manufactured according to the operation in the step (1) of Embodiment VI.

(2) The core is added to the carbon source at a temperature of 20° C. and stirred for at a speed of 450 rpm for 7 h to obtain a mixture. The mixture is processed at a temperature of 120° C. for 18 h to obtain a cured product. In a protective gas atmosphere, the cured product is processed at a temperature of 700° C. for 4 h to obtain a carbide.

(2) 0.02 g of initiator is dissolved in 20 mL of the strong acid aqueous solution with a molar mass of 1.5M, and cooled to obtain an initiator solution. 0.4 g of the carbide is dissolved in 35 mL of the strong acid aqueous solution with the molar mass of 1.5M, and sonicated for 35 min and then stirred at a temperature of 2.5° C. for 25 min, with 0.3 mL of monomer added, and ultrasonically mixed to obtain a dispersion. The initiator solution is added to the dispersion and stirred at a temperature of 2.5° C. and at a speed of 500 rpm for 14 h to polymerize the monomer. A reaction product is washed with water and ethanol and dried to obtain the conductive particle. A mass ratio of the dispersion to the initiator solution equals to 30:1. The strong acid is $HClO_4$. The monomer is aniline. The initiator is ammonium persulfate.

2. The structure of the conductive particle in this embodiment is substantially the same as that in the Embodiment III, except that the conductive carbon layer has no carboxyl group, and there is no amide structure formed by the conductive carbon layer and the conductive polymer layer.

3. The formulation of the adhesive in this embodiment is the same as that in the Embodiment VI.

Embodiment XI

1. A process of manufacturing a conductive particle in this embodiment is provided as follows.

(1) An acidified carbide is manufactured according to the operation in the steps (1) to (2) of the Embodiment VI.

(2) 0.02 g of initiator is dissolved in 20 mL of the strong acid aqueous solution with a molar mass of 1.5M, and cooled to obtain an initiator solution. 0.6 g of the acidified carbide is dissolved in 35 mL of the strong acid aqueous solution with the molar mass of 1.5M, and sonicated for 35 min and then stirred at a temperature of 2.5° C. for 25 min, with 0.3 mL of monomer added, and ultrasonically mixed to obtain a dispersion. The initiator solution is added to the dispersion and stirred at a temperature of 2.5° C. and at a speed of 500 rpm for 14 h to polymerize the monomer. A reaction product is washed with water and ethanol and dried to obtain the conductive particle. The mass ratio of the dispersion to the initiator solution equals to 30:1. The strong acid is $HClO_4$. The monomer is aniline. The initiator is ammonium persulfate.

2. The structure of the conductive particle in this embodiment is substantially the same as that in the Embodiment III, except that the conductive polymer in the conductive polymer layer is block polyaniline.

3. The formulation of the adhesive in this embodiment is the same as that in the Embodiment VI.

Embodiment XII

1. A process of manufacturing a conductive particle in this embodiment is provided as follows.

(1) The core is manufactured according to the step (1) in the Embodiment III.

(2) 0.02 g of initiator is dissolved in 20 mL of the strong acid aqueous solution with a molar mass of 1.5M, and cooled to obtain an initiator solution. 0.8 g of the core is dissolved in 35 mL of the strong acid aqueous solution with the molar mass of 1.5M, and sonicated for 35 min and then stirred at a temperature of 2.5° C. for 25 min, with 0.3 mL of monomer added, and ultrasonically mixed to obtain a dispersion. The initiator solution is added to the dispersion and stirred at a temperature of 2.5° C. and at a speed of 500 rpm for 14 h to polymerize the monomer. The reaction product is washed with water and ethanol and dried to obtain the conductive particle. The mass ratio of the dispersion to the initiator solution equals to 30:1. The strong acid is $HClO_4$. The monomer is aniline. The initiator is ammonium persulfate.

2. The conductive particle in this embodiment is substantially the same as that in the Embodiment III, except that there is no conductive carbon layer, and the conductive polymer layer directly coats the core.

3. The formulation of the adhesive in this embodiment is the same as that in the Embodiment VI.

Embodiment XIII

1. A process of manufacturing a conductive particle in this embodiment is provided as follows.

(1) The acidified carbide is manufactured according to the steps (1) to (2) in the Embodiment III, i.e., the conductive particle.

2. The conductive particle in this embodiment is substantially the same as that in the Embodiment III, except that there is no conductive polymer layer.

3. The formulation of the adhesive in this embodiment is the same as that in the Embodiment VI.

Embodiment XIV

1. A process of manufacturing a conductive particle in this embodiment is provided as follows.

(1) The core is added to the carbon source at a temperature of 20° C. and stirred at a speed of 450 rpm for 7 h to obtain a mixture. The mixture is processed at a temperature of 120° C. for 18 h to obtain a cured product. Under a protective gas atmosphere, the cured product is processed at a temperature of 700° C. for 4 h to obtain a carbide. 3 g of the carbide is put into 70 mL of $HNO_3$ aqueous solution with a molar mass of 2.5M, and stirred at a temperature of 70° C. and at a speed of 460 rpm for 3.5 h, and then washed and dried with deionized water to obtain the acidified carbide. The protective gas is nitrogen. The core is porous silica spheres.

(2) The conductive particle is manufactured according to the step (3) in the Embodiment III.

2. The formulation of the adhesive in this embodiment is the same as that in the Embodiment VI.

Embodiment XV

1. The conductive particle in this embodiment and the manufacturing method thereof are the same as those in the Embodiment I.

2. The adhesive in this embodiment is substantially the same as that in the Embodiment IV, except that the adhesive in this embodiment contains 6 parts of conductive particle.

Embodiment XVI

1. The conductive particle in this embodiment and the manufacturing method thereof are the same as those in the Embodiment I.

2. The adhesive in this embodiment is substantially the same as that in the Embodiment V, except that the adhesive in this embodiment contains 80 parts of resin.

Figure 4:
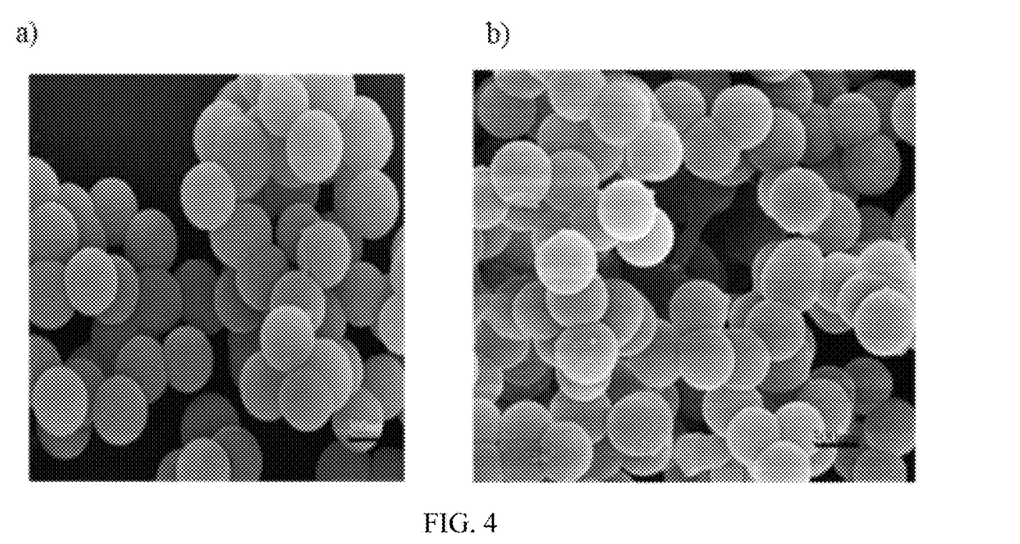
FIG. 4 is a scanning electron micrograph of a carbide according to an embodiment I.
Figure 5:
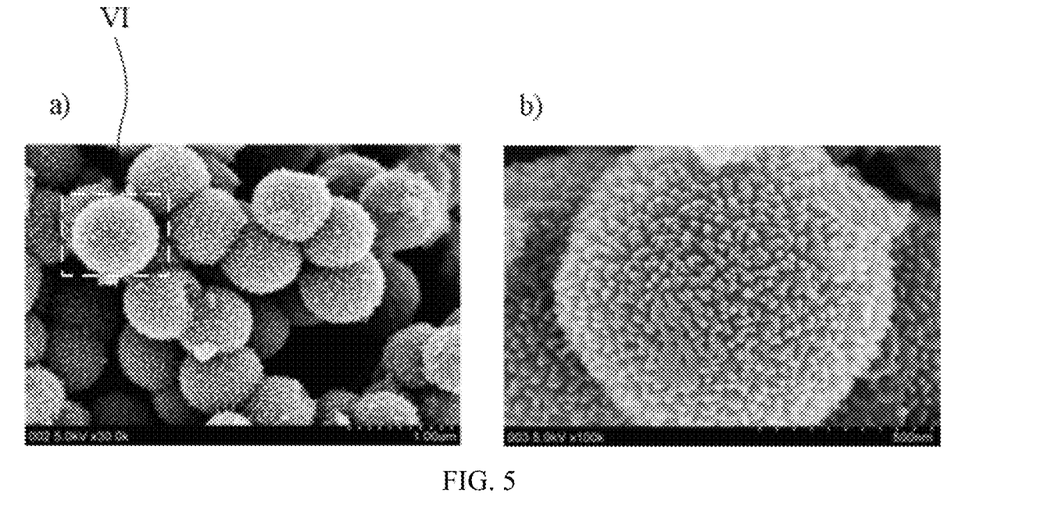
FIG. 5 is a scanning electron micrograph of a conductive particle according to the embodiment I.

Test:

1. The structures of the carbide and the conductive particle in the Embodiment I are measured by a scanning electron microscope. The measurement results are shown in FIGS. 4 to 5. FIG. 4 is a scanning electron microscope image of the carbide in the Embodiment I. In the FIG. 4, FIG a) is a scanning electron microscope image of porous silicon spheres, and FIG b) is a scanning electron microscope image of porous silicon carbides. FIG. 5 is a scanning electron microscope image of the conductive particles in the Embodiment I. In the FIG. 5, FIG a) is a scanning electron microscope image of conductive particles, and FIG b) is a partial enlarged view of a region V in FIG a).

It can be seen from FIG. 4 that the surface of the carbide is relatively smooth. It can be seen from FIG. 5 that there are many linear substances on the surface of the conductive particle, indicating the polyaniline nanowires formed on the surface of the carbide.

Figure 6:
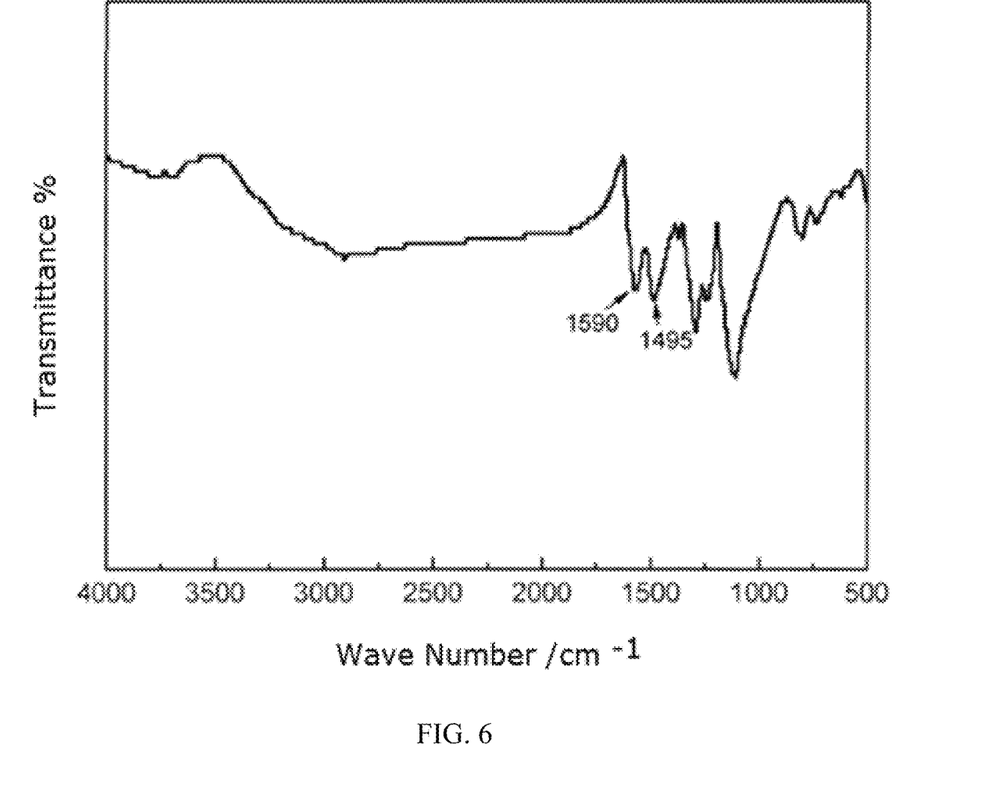
FIG. 6 is an infrared spectrogram of an amide ester structure formed by a conductive carbon layer and a conductive polymer layer according to the embodiment I.

2. An amide ester structure formed by the conductive carbon layer and the conductive polymer layer in the conductive particle of the Embodiment I is measured by an infrared measuring method, as shown in FIG. 6. In FIG. 6, peaks with wave numbers of 1590 $cm^{-1}$ and 1495 $cm^{-1}$ are characteristic peaks of the amide ester structure.

3. The conductivity and compressive strength of the conductive particles in the Embodiments I to XVI and the compatibility of the conductive particle with an organic resin, and the adhesion of the adhesives in the Embodiments I to XVI. The measurement results are shown in the following Table 1.

The conductivity of the conductive particle is measured by using a conductivity tester.

The compressive strength of the conductive particle is measured by using a compressive tester.

The tensile strength of the adhesive is measured by a tension tester.

TABLE 1

Conductivity and compressive strength of conductive particle and compatibility of conductive particle with organic resin in the Embodiments I to XVI

|  | Conductivity (s/m) | Compressive strength (MPa) | Tensile strength of adhesive (MPa) |
| --- | --- | --- | --- |
| Embodiment I | 106 | 86 | 88 |
| Embodiment II | 134 | 68 | 122 |
| Embodiment III | 187 | 87 | 113 |
| Embodiment IV | 106 | 86 | 92 |
| Embodiment V | 134 | 68 | 116 |
| Embodiment VI | 187 | 87 | 115 |
| Embodiment VII | 152 | 80 | 113 |
| Embodiment VIII | 144 | 98 | 116 |
| Embodiment IX | 130 | 71 | 120 |
| Embodiment X | 84 | 80 | 121 |
| Embodiment XI | 108 | 82 | 119 |
| Embodiment XII | 65 | 76 | 120 |
| Embodiment XIII | 72 | 72 | 118 |
| Embodiment XIV | 133 | 20 | 116 |
| Embodiment XV | 127 | 84 | 95 |
| Embodiment XVI | 131 | 62 | 125 |

It can be seen from the Table 1 that the conductivity of the conductive particles in Embodiments I to XI and XIV to XVI is in a range of 84 s/m to 187 s/m, and the compressive strength is in a range of 62 MPa to 98 MPa, which is better than that in the Embodiments XII to XIII, indicating that the conductive particles in the above embodiments have a higher conductivity and a better compressive strength. The conductivity of the conductive particles manufactured in the Embodiment IV and Embodiment VI reaches 187 s/m, and the compressive strength reaches 87 MPa, such conductive particles are suitable for use as the sealant and ACF.

The tensile strength of the adhesives in the Embodiments II to III, V to XIV, and Embodiment XVI is in a range of 113 MPa to 128 MPa, which is better than that in the Embodiments I, IV and XV, which indicates that the adhesive in the above embodiments has a stronger adhesion, and can be used as the sealant and ACF to manufacture the electronic products.

In conclusion, the conductive particle in the above embodiments has a higher conductivity and a better compressive strength, and the manufactured adhesive has a stronger adhesion and can be used as the sealant and ACF to manufacture the electronic products.

The embodiments can be combined arbitrarily. In order to make the description concise, all possible combinations of the various features in the above-mentioned embodiments are not described.

What is claimed is:

1. A conductive particle, comprising:
a core;
a conductive carbon layer covering the core; and a conductive polymer layer provided on the conductive carbon layer, wherein the conductive polymer layer is spaced apart from the core, a material of the conductive carbon layer has a carboxyl group, and the carboxyl group forms a chemical bond with a material of the conductive polymer layer.

2. The conductive particle according to claim 1, wherein a material of the conductive polymer layer has an amino group, the amino group and a carboxyl group form an amide ester structure;
or, the material of the conductive polymer layer has a hydroxyl group, the hydroxyl group and the carboxyl group form an ester group structure;
or, the material of the conductive polymer layer contains a substance forms a bonding structure with the carboxyl group.

3. The conductive particle according to claim 1, wherein the core comprises a solid base and a porous layer coating the solid base, and the conductive carbon layer is at least partially received in the porous layer.

4. The conductive particle according to claim 3, wherein the solid base is silica spheres, titanium dioxide spheres or polystyrene spheres;
and/or, the porous layer is a porous silica layer;
and/or, a thickness of the porous layer is in a range of 20 nm to 200 nm;
and/or, a pore size of the porous layer is in a range of 10 nm to 100 nm.

5. The conductive particle according to claim 1, wherein the conductive carbon layer has a porous structure;
and/or, a material of the conductive polymer layer is a conductive polymer, and the conductive polymer is at least one of polyaniline and polypyrrole.

6. The conductive particle according to claim 1, wherein a material of the conductive carbon layer is a nano-carbon material;
and/or, a material of the conductive polymer layer is a conductive polymer, and the conductive polymer is a nanowire.

7. The conductive particle according to claim 1, wherein an outer diameter of the core is in a range of 0.2 μm to 2 μm;
and/or, a thickness of the conductive polymer layer is in a range of 0.1 μm to 0.5 μm;
and/or, a particle size of the conductive particle is in a range of 0.5 μm to 2 μm.

8. A conductive particle, comprising:
a core;
a conductive carbon layer covering the core; and
a conductive polymer layer provided on the conductive carbon layer, wherein a material of the conductive carbon layer has a carboxyl group, and the carboxyl group forms a chemical bond with a material of the conductive polymer layer.

9. The conductive particle according to claim 8, wherein a material of the conductive polymer layer has an amino group, the amino group and a carboxyl group form an amide ester structure;
or, the material of the conductive polymer layer has a hydroxyl group, the hydroxyl group and the carboxyl group form an ester group structure;
or, the material of the conductive polymer layer contains a substance forms a bonding structure with the carboxyl group.

10. The conductive particle according to claim 8, wherein the core comprises a solid base and a porous layer coating the solid base, and the conductive carbon layer is at least partially received in the porous layer.

11. The conductive particle according to claim 10, wherein the solid base is silica spheres, titanium dioxide spheres or polystyrene spheres;
and/or, the porous layer is a porous silica layer;
and/or, a thickness of the porous layer is in a range of 20 nm to 200 nm;
and/or, a pore size of the porous layer is in a range of 10 nm to 100 nm.

12. The conductive particle according to claim 8, wherein the conductive carbon layer has a porous structure;
and/or, a material of the conductive polymer layer is a conductive polymer, and the conductive polymer is at least one of polyaniline and polypyrrole.

13. The conductive particle according to claim 8, wherein a material of the conductive carbon layer is a nano-carbon material;
and/or, a material of the conductive polymer layer is a conductive polymer, and the conductive polymer is a nanowire.

14. The conductive particle according to claim 8, wherein an outer diameter of the core is in a range of 0.2 μm to 2 μm;
and/or, a thickness of the conductive polymer layer is in a range of 0.1 μm to 0.5 μm;
and/or, a particle size of the conductive particle is in a range of 0.5 μm to 2 μm.

15. A conductive particle, comprising:
a core, wherein the core comprises a solid base and a porous layer coating the solid base, and a conductive carbon layer is at least partially received in the porous layer;
the conductive carbon layer covering the core; and
a conductive polymer layer provided on the conductive carbon layer.

16. The conductive particle according to claim 15, wherein a material of the conductive carbon layer has a carboxyl group, and the carboxyl group forms a chemical bond with the material of the conductive polymer layer.

17. The conductive particle according to claim 16, wherein a material of the conductive polymer layer has an amino group, the amino group and a carboxyl group form an amide ester structure;
or, the material of the conductive polymer layer has a hydroxyl group, the hydroxyl group and the carboxyl group form an ester group structure;
or, the material of the conductive polymer layer contains a substance forms a bonding structure with the carboxyl group.

18. The conductive particle according to claim 15, wherein the solid base is silica spheres, titanium dioxide spheres or polystyrene spheres;
and/or, the porous layer is a porous silica layer;
and/or, a thickness of the porous layer is in a range of 20 nm to 200 nm;
and/or, a pore size of the porous layer is in a range of 10 nm to 100 nm.

19. The conductive particle according to claim 15, wherein the conductive carbon layer has a porous structure;
and/or, a material of the conductive polymer layer is a conductive polymer, and the conductive polymer is at least one of polyaniline and polypyrrole.

* * * * *